United States Patent
Wu

(10) Patent No.: US 11,642,733 B2
(45) Date of Patent: May 9, 2023

(54) REPAIRING TOOL FOR ELECTRIC WIRE THREADING HEAD

(71) Applicant: Kuei-Kun Wu, Kaohsiung (TW)

(72) Inventor: Kuei-Kun Wu, Kaohsiung (TW)

( * ) Notice: Subject to any disclaimer, the term of this patent is extended or adjusted under 35 U.S.C. 154(b) by 115 days.

(21) Appl. No.: 17/190,604

(22) Filed: Mar. 3, 2021

(65) Prior Publication Data

US 2022/0161340 A1 May 26, 2022

(30) Foreign Application Priority Data

Nov. 20, 2020 (TW) ................................ 109140712

(51) Int. Cl.
| | | |
|---|---|---|
| *B23G 5/04* | (2006.01) | |
| *B23G 5/06* | (2006.01) | |
| *B23G 9/00* | (2006.01) | |
| *H02G 1/00* | (2006.01) | |
| *B23G 1/26* | (2006.01) | |

(52) U.S. Cl.
CPC ............... *B23G 5/06* (2013.01); *B23G 9/009* (2013.01); *B23G 1/263* (2013.01); *H02G 1/00* (2013.01)

(58) Field of Classification Search
CPC .......... B23G 1/26; B23G 1/263; B23G 1/267; B23G 5/04; B23G 5/043; B23G 5/10; B23G 5/103; B23G 1/46; B23G 9/009; B23G 5/06; B23G 7/02
USPC .................................. 470/190, 207; 408/181
See application file for complete search history.

(56) References Cited

U.S. PATENT DOCUMENTS

| | | | | |
|---|---|---|---|---|
| 530,166 A | * | 12/1894 | Dost | B23D 77/042 408/184 |
| 818,007 A | * | 4/1906 | Westman | B23G 5/10 408/184 |
| 828,150 A | * | 8/1906 | Tobias | B23G 5/10 408/184 |
| 863,756 A | * | 8/1907 | Reilly | B23B 51/00 470/190 |
| 980,864 A | * | 1/1911 | Clark | B23G 5/10 408/184 |
| 1,404,546 A | * | 1/1922 | Roeder | B23G 1/261 470/207 |
| 2,858,720 A | * | 11/1958 | Duda | B21H 3/04 72/104 |
| 4,942,752 A | * | 7/1990 | Heitman | B21H 7/14 72/70 |

(Continued)

*Primary Examiner* — Edward T Tolan
(74) *Attorney, Agent, or Firm* — Muncy, Geissler, Olds & Lowe, P.C.

(57) ABSTRACT

A repairing tool for an electric wire threading head for pressing and squeezing a drawing-in wire of the electric wire includes a first holding part, a second holding part opposite to the first holding part, and two positioning bolts for fastening the first holding part and the second holding part. A first half screw hole and a second half screw hole are protrudingly formed on the first holding part and the second holding part to form a complete screw hole. The drawing-in wire is pressed and squeezed through the positive rotation or reverse rotation of the repairing tool to form an external screw thread part and increase a screw thread area, and the surface of the external screw thread part is applied with instant dry adhesive and rotated into a pulling head, so that the drawing-in wire is closely adhered to the pulling head and tensile strength is improved.

5 Claims, 14 Drawing Sheets

(56) References Cited

U.S. PATENT DOCUMENTS

2010/0313627 A1* 12/2010 Case .................. B23G 9/009
                                                   72/469

* cited by examiner

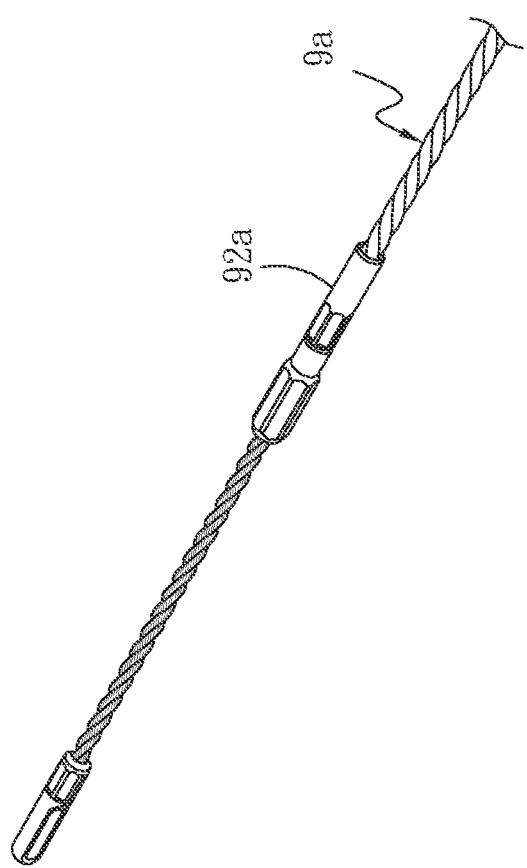

REPAIRING TOOL FOR ELECTRIC WIRE THREADING HEAD

FIELD OF THE INVENTION

The invention relates to a repairing tool, in particular to a repairing tool for an electric wire threading head.

BACKGROUND OF THE INVENTION

Please refer to FIG. 1, the current installation of wires in new houses or old houses are mostly inserting exposed wires into concealed conduits, and then pulling the wires in the concealed conduits by a wire pulling tool. Generally, according to different materials of a conventional wire puller 1, there are a plurality of combination methods for connecting a pull head 12 with a drawing-in wire 11, such as stamping, gluing, plastic perfusion and folding, etc. It often occurs in a work site where the drawing-in wire 11 is frequently broken III or the pull head 12 at the front end of the drawing-in wire 11 is fallen off. Therefore, a demand of onsite repairing the conventional wire puller 1 is required. If the conventional wire puller 1 cannot be repaired immediately at the work site, the conventional wire puller 1 has to be sent back to the factory. It would be save time for electricians to repair the conventional wire puller 1 at the work site and avoid waste of time going back and forth.

Please refer to FIG. 2A and FIG. 2B, the electricians find a breakage 200 between a drawing-in wire 20 and an iron joint 2 with appropriate thickness at the work site, and the electricians can repair immediately at the work site by using the repair tool. There is a repair tool on the market can perform crimping at a concave hole 21 of an iron joint 2 by using manual crimp terminal pliers to repair the breakage 200 of the drawing-in wire 20 (as shown in an arrow of FIG. 2B). In this way, if the drawing-in wire 20 is a PET twisted wire, the tension of the PET twisted wire after crimping will be unsatisfactory due to a concave line of the PET twisted wire, and a pressing force of the manual crimp terminal pliers will have different crimping effect depending on hand strength of each individual. It is also a financial pressure for the electricians since a market price of the manual crimp terminal pliers. In addition, the manual crimp terminal pliers can only be used with the iron joint 2 and cannot be used for non-conductive plastic joints, which is not ideal for use.

Moreover, a repair tool 3 is further developed in an industry, as shown in FIG. 3, FIG. 4 and FIG. 5. The repair tool 3 includes a drawing-in wire 4 which is mad of a three-strand of helical PET wire, a pull head 31 includes an internal screw thread 311, and an internal sharpening hole 321 is formed on one end of a pencil sharpener 32, an external screw thread tapping device 33 including a plurality of notches 331 and chip holes 332 arranged at intervals, and a number of the plurality of notches 331 and the chip holes 332 matches a linear diameter of the drawing-in wire 4. A broken position of the drawing-in wire 4 is trimmed a similar conical shape 41, and the external screw thread tapping device 33 is screwed in from the similar conical shape 41 of the drawing-in wire 4 upon using, and the internal screw threads 333 on inner peripheries of the plurality of notches 331 scrape an outer periphery of the drawing-in wire 4 to form an external screw thread 42. Afterwards, the external screw thread tapping device 33 is screwed out to break off the similar conical shape 41 trimmed by the drawing-in wire 4, and then an instant glue 34 is applied to a surface of the external screw thread 42 of the drawing-in wire 4 to be screwed into the pull head 31, so that the external screw thread 42 of the drawing-in wire 4 is screwed joint with the internal screw thread 311 of the pull head 31 (as shown in FIG. 6). Please refer to FIG. 4C, if the external screw thread tapping device 33 is used on the drawing-in wire 4 of the three-strand of helical PET wire to scrape off the external screw thread 42, or a square drawing-in wire 40 of a single-strand of helical PET wire scrapes off the external screw thread 404 as shown in FIG. 7A and FIG. 7B, and the instant glue 34 is applied to the surface of the external screw thread 401 of the square drawing-in wire 40. A linear diameter of the three-strand of helical PET wire is thin in view of the three-strand of helical PET wire is a twisted strand of a monofilament wire. If the plurality of notches 331 of the external screw thread tapping device 33 are used to scrape off the three-strand of helical PET wire of the drawing-in wire 4 or form the external screw threads 42 (401) from corners of the square drawing-in wire 40, the three-strand of helical PET wire of the drawing-in wire 4 or each of corners of the square drawing-in wire 40 is directly scraped off to reduce the screw thread area, and a linear diameter of the monofilament wire is destroyed, so a tensile strength between the drawing-in wire 4 and the pull head 31 or the square drawing-in wire 40 and the pull head 31 is greatly affected. Therefore, the repair tool 3 needs further improvement.

SUMMARY OF THE INVENTION

The main purpose of the present invention is to solve problems derived from the structure disadvantage of existing repairing tool.

In order to achieve the above purpose, the present invention provides a repairing tool for an electric wire threading head, which is the repairing tool for pressing and squeezing a drawing-in wire of the electric wire. The repairing tool includes a first holding part, a second holding part and two positioning bolts. The first holding part includes two threading holes respectively formed on two sides of the first holding part, a first abutting part formed at one end of the first holding part, and a first half screw hole protrudingly formed on the first abutting part. The second holding part and the first holding part are opposite to each other. The second holding part includes a second abutting part formed opposite to the first abutting part, two internal screw holes respectively formed on two sides of the second abutting part and face the threading holes of the first holding part, and a second half screw hole protrudingly formed on the second abutting part and opposite to the first half screw hole of the first abutting part. The two positioning bolts are respectively penetrated into the two threading holes of the first holding part and screwed joint with the two internal screw holes of the second holding part. The first holding part and the second holding part move to each other through the two positioning bolts, so that the first half screw hole of the first holding part and the second half screw hole of the second holding part form a screw hole.

Further, a first fixing hole which is formed on the first holding part where is vertically below the first half screw hole; the first abutting part is provided with a first containing chamber with a first opening corresponding to the first half screw hole to provide a first screw thread part for embedding into the first containing chamber from the first opening, wherein a first internal screw hole corresponding to the first fixing hole of the first holding part is formed in the first screw thread part, and a first fixing member is penetrated into the first fixing hole of the first holding part and the first internal screw hole of the first screw thread part, and the first fixing member is screwed to the first internal screw hole of the first screw thread part, the first half screw hole is protrudingly formed on the first abutting part by the first screw thread part, wherein a second fixing hole which is formed in the second holding part where is vertically below the second half screw hole; the second abutting part is provided with a second containing chamber with a second opening corresponding to the second half screw hole to provide a second screw thread part for embedding into the second containing chamber from the second opening, wherein a second internal screw hole corresponding to the second fixing hole of the second holding part is formed on the second screw thread part, a second fixing member penetrates into the second fixing hole of the second holding part and the second internal screw hole of the second screw thread part; and the second fixing member is correspondingly screwed joint with the second internal screw hole of the second screw thread part, and the second half screw hole is protrudingly formed on the second screw thread part from one end of the second abutting part.

Further, the shapes of the first screw thread part and the second screw thread part are oblong or rectangular, wherein shapes of the first containing chamber of the first abutting part and the second containing chamber of the second abutting part match with the first screw thread part and the second screw thread part to be oblong or rectangular.

Further, the threading holes of the first holding part are countersunk holes, wherein the two internal screw holes of the second holding part are internal threads of a nut; each of the two positioning bolts includes a head end penetrating into one of the two threading holes of the first holding part, and a screw rod externally stretching from the head end to be screwed joint with one of the two internal screw holes of the second holding part.

Further, the diameter of the first half screw hole and the second half screw hole oppositely arranged on the first abutting part and the second abutting part matches with the diameter of the drawing-in wire of the electric wire.

Further, the first holding part and the second holding part are assembled as cross-shaped or polygonal-shaped.

Further, the first holding part and the second holding part further include a plurality of convex parts and concave arc parts arranged on outer peripheries of the first holding part and the second holding part at intervals.

Through the above disclosure of the present invention, compared with the prior art, the present invention has the following characteristics: according to the repairing tool for the electric wire threading head provided by the present invention, the first holding part and the second holding part can move to each other relatively and synchronously by the positioning bolts, so that the first half screw hole and the second half screw hole which are protrudingly formed on the first holding part and the second holding part move to each other to form the screw hole; by the positive rotation or reverse rotation of the repairing tool, the drawing-in wire of the electric wire is pressed and squeezed by the screw hole of the repairing tool to form the external screw thread part and increase the screw thread area; the instant dry adhesive is applied on the surface of the external screw thread part and the external screw thread part is rotated into the internal screw thread of the pulling head, so that the drawing-in wire of the electric wire is tightly attached with the pulling head; the tensile strength of the drawing-in wire of the electric wire after being bonded to the pulling head is increased, and electricians are convenient to repair the broken position of the drawing-in wire of the electric wire immediately at the operation site.

BRIEF DESCRIPTION OF THE DRAWINGS

FIG. 16 is a three-dimensional diagram of a combination of a drawing-in wire of a single-strand electric wire in FIG. 15A after being pressed and squeezed and an iron pulling head.

DETAILED DESCRIPTION OF THE PREFERRED EMBODIMENTS

Figure 1:
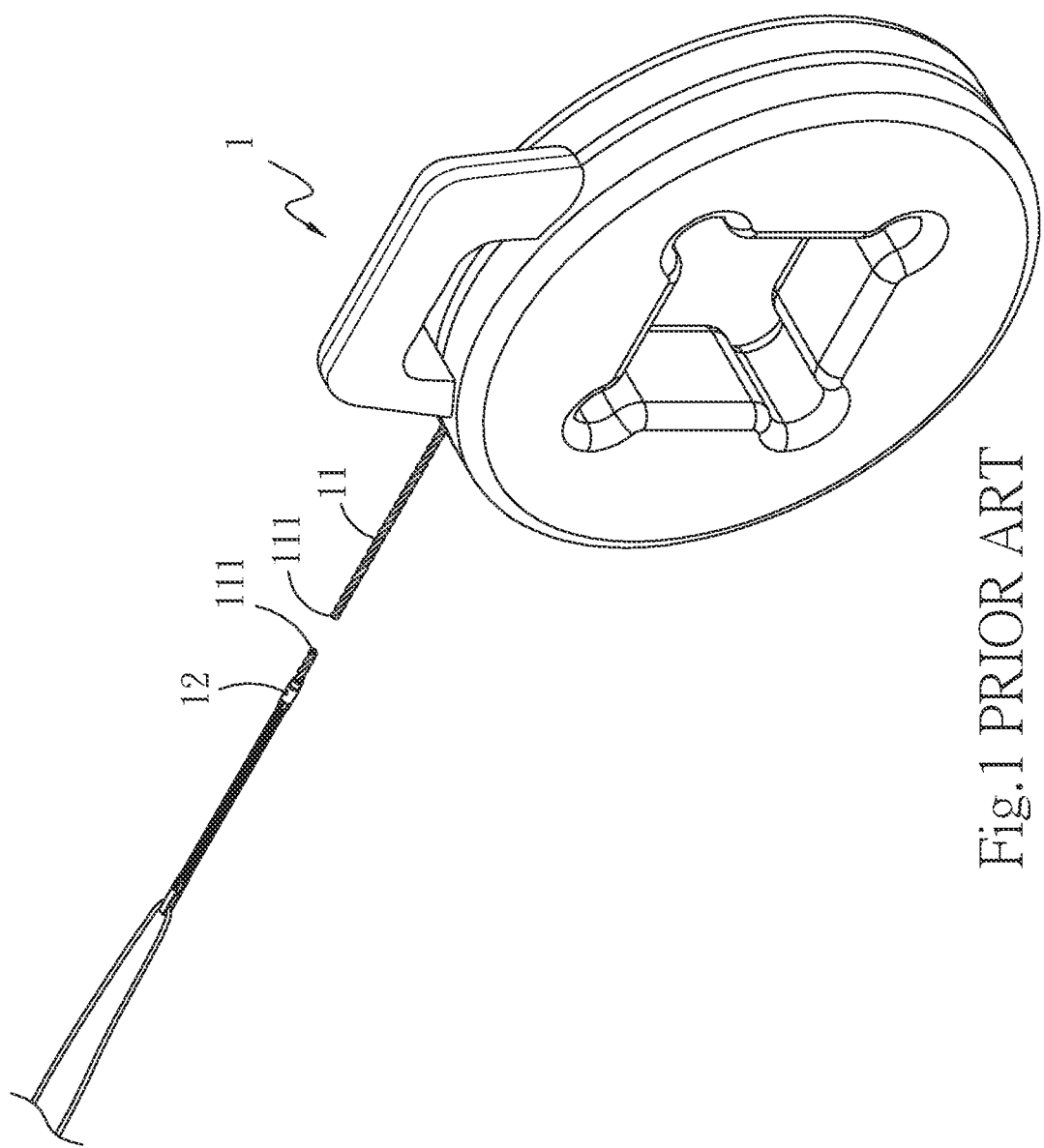
FIG. 1 is a three-dimensional schematic diagram of a broken drawing-in wire of an electric wire of a current electric wire puller.
Figure 2B:
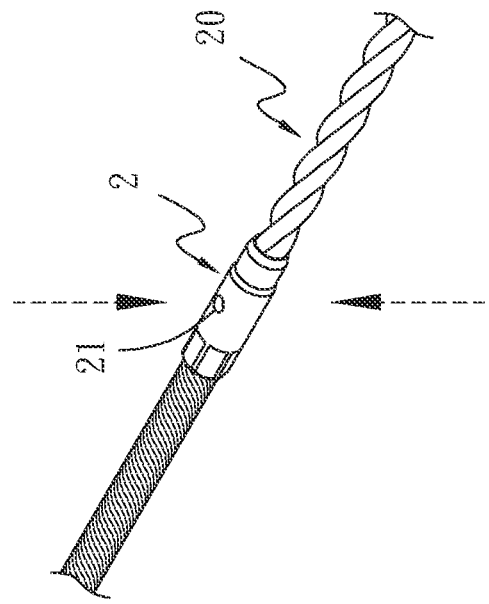
FIG. 2B is a three-dimensional schematic diagram of a manual crimped iron joint of a manual terminal crimping tool in FIG. 2A.
Figure 2A:
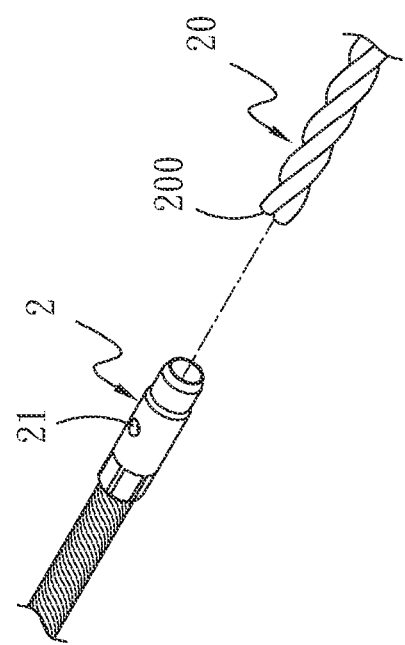
FIG. 2A is a three-dimensional schematic diagram of a broken drawing-in wire and a broken iron joint of an electric wire of a commercially available repairing tool.
Figures 3, 4A:
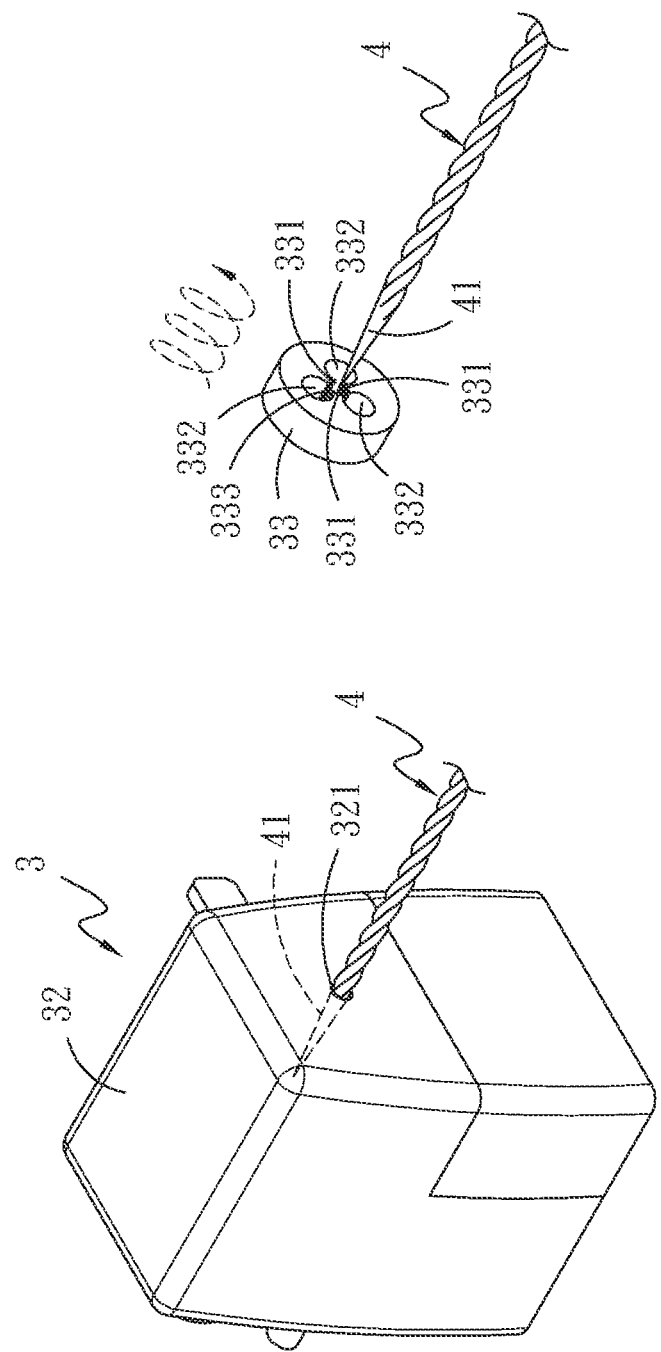
FIG. 3 is a three-dimensional diagram of another existing repairing tool that breaks a drawing-in wire of a three-strand twisted wire into a nearly conical shape.
FIG. 4A is a three-dimensional schematic diagram of an external screw thread tapping device of FIG. 3 screwed into the drawing-in wire.
Figure 4C:
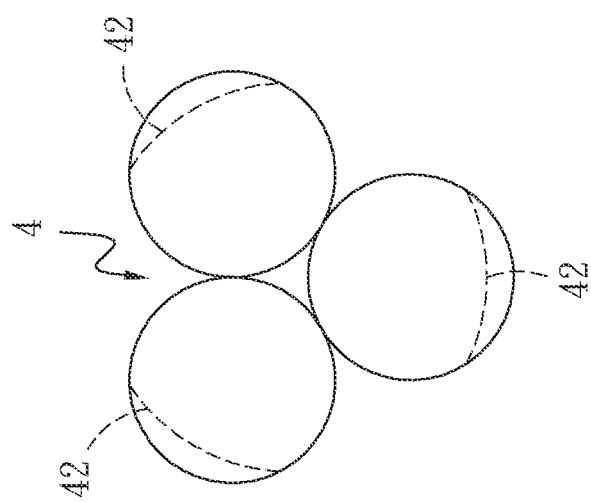
FIG. 4C is an enlarged side view of a drawing-in wire in FIG. 4B as an external screw thread.
Figure 4B:
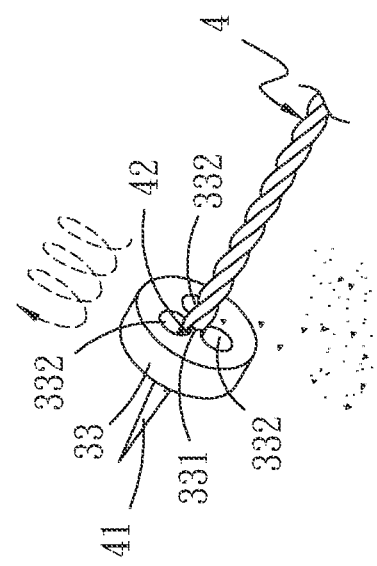
FIG. 4B is a three-dimensional schematic diagram of an external screw thread tapping device of FIG. 4A scraping a drawing-in wire as an external screw thread to be screwed out.
Figure 6:
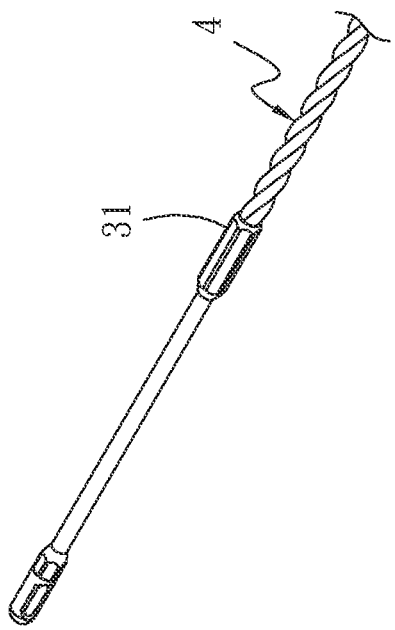
FIG. 6 is a three-dimensional diagram of a combination of a drawing-in wire and a pulling head in FIG. 5.
Figure 5:
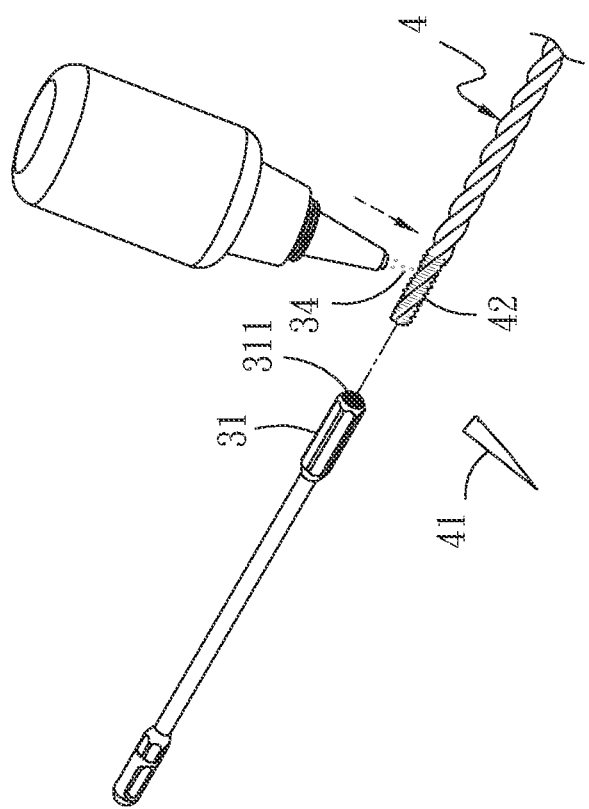
FIG. 5 is a three-dimensional schematic diagram of FIG. 4C coating instant glue on the surface of an external screw thread of a drawing-in wire.
Figure 7B:
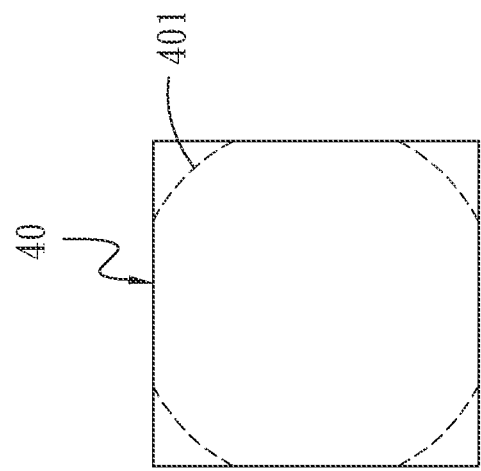
FIG. 7B is an enlarged side view of a square drawing-in wire of a single-strand twisted wire as an external screw thread in FIG. 7A.
Figure 7A:
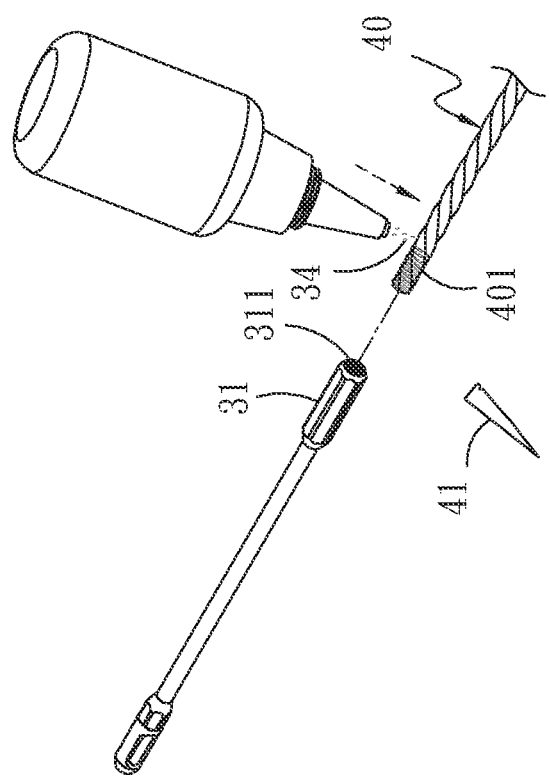
FIG. 7A is a three-dimensional schematic diagram of another existing repairing tool that scrapes an external screw thread a square drawing-in wire of a single-strand twisted wire and applies instant glue on the surface of the external screw thread of the square drawing-in wire.
Figure 8:
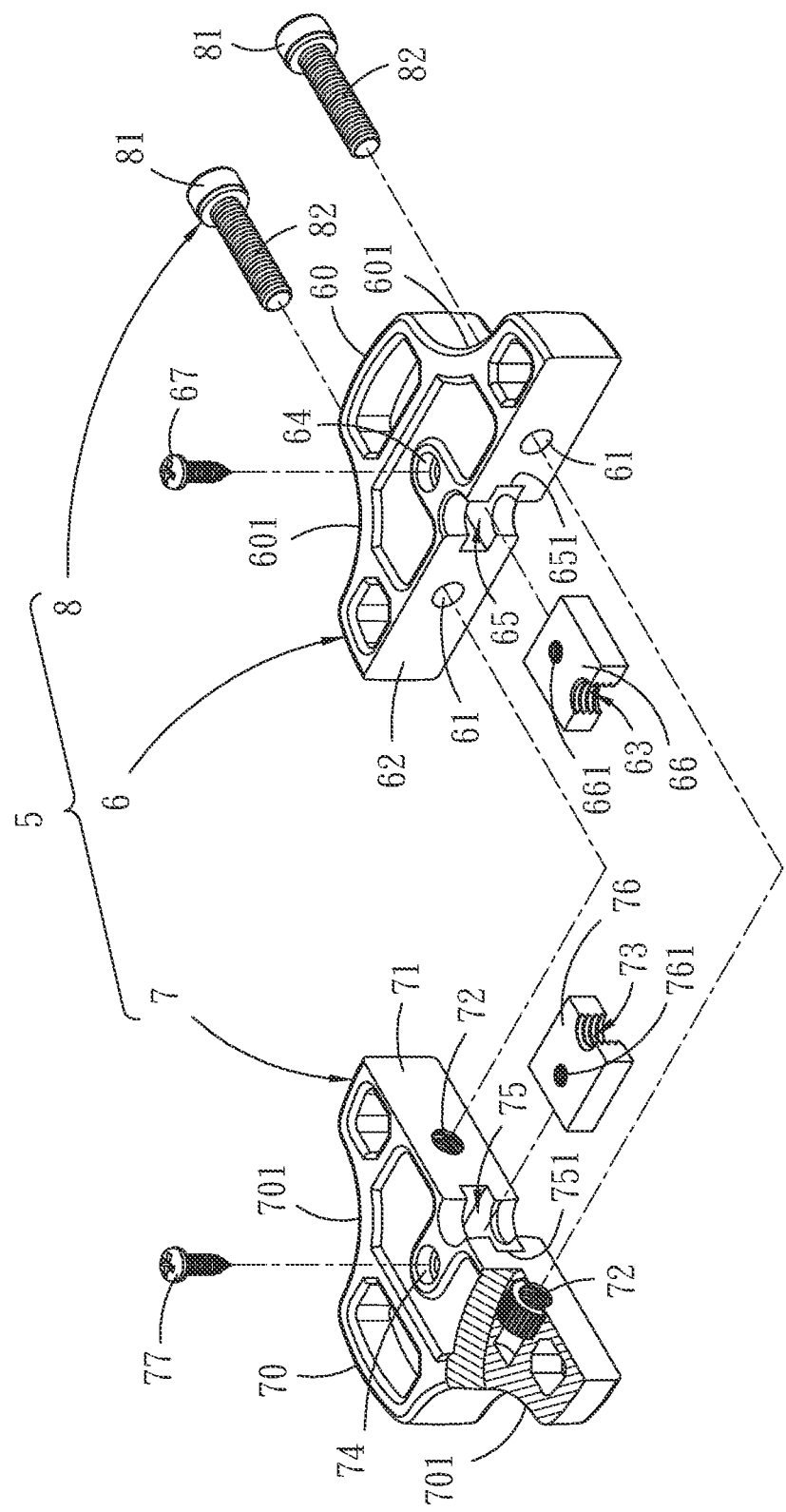
FIG. 8 is a three-dimensional exploded view of a repairing tool for an electric wire threading head of the present invention.
Figure 10:
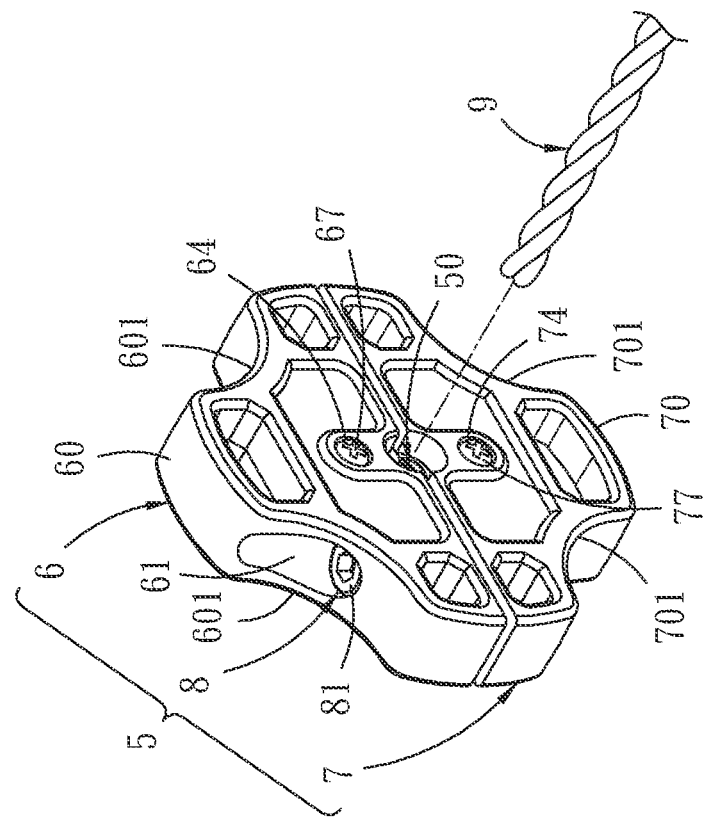
FIG. 10 is a three-dimensional exploded view of a repairing tool and a drawing-in wire of an electric wire in FIG. 8.
Figure 9:
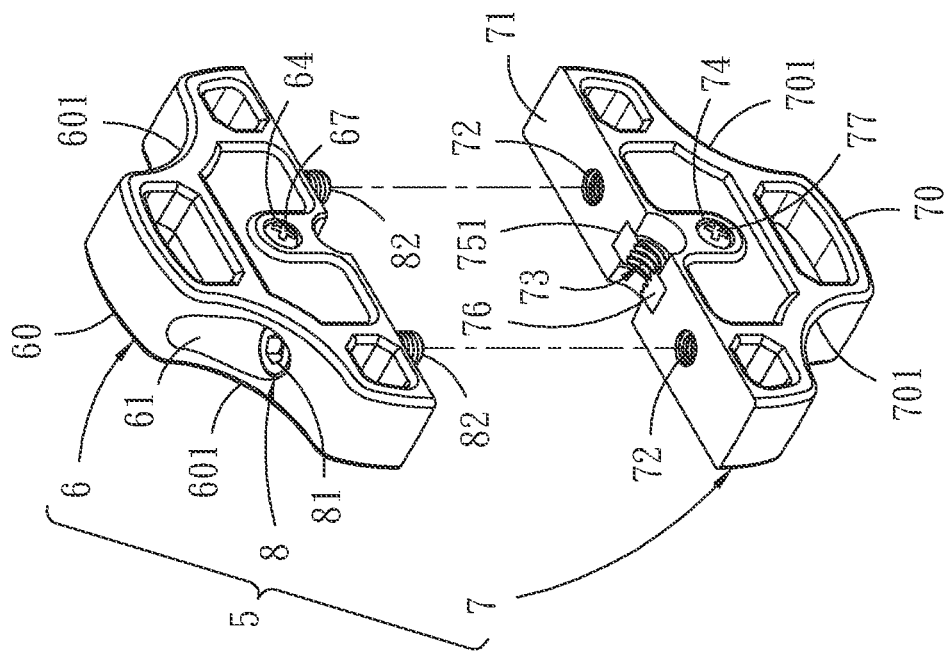
FIG. 9 is another three-dimensional exploded view of a repairing tool for an electric wire threading head in FIG. 8.

The detailed description and technical content of the present invention are described as follows in conjunction with the accompanying drawings:

Please refer to FIG. 8, FIG. 9, FIG. 10, FIG. 11A, FIG. 11B, FIG. 11C, FIG. 12 and FIG. 15A, the present invention provides a repairing tool for an electric wire threading head, a repair tool 5 is for pressing and squeezing a drawing-in wire 9 (9a), the repair tool 5 includes a first holding part 6, a second holding part 7 and two positioning bolts 8, wherein the first holding part 6 includes two threading holes 61 respectively formed on two sides of the first holding part 6, a first abutting part 62 is formed at one end of the first holding part 6, and a first half screw hole 63 protrudingly formed on the first abutting part 62. In an embodiment of the present invention, a first fixing hole 64 is formed on the first holding part 6 where is vertically below the first half screw hole 63, the first abutting part 62 is provided with a first containing chamber 65 with a first opening 651 to provide a first screw thread part 66 for embedding into the first containing chamber 65 from the first opening 651. A first internal screw hole 661 corresponding to the first fixing hole 64 of the first holding part 6 is formed on the first screw thread part 66, and a first fixing member 67 which is a screw penetrating into the first fixing hole 64 of the first holding part 6 and the first internal screw hole 661 of the first screw thread part 66, the first fixing member 67 is in a manner of screw joint with the first internal screw hole 661 of the first screw thread part 66 thereby the first half screw hole 63 protrudingly formed on the first abutting part 62 by the first screw thread part 66. In addition, the two threading holes 61 of the first holding part 6 are countersunk holes.

The second holding part 7 is reversely disposed against the first holding part 6, wherein the second holding part 7 includes a second abutting part 71 formed opposite to the first abutting part 62, two internal screw holes 72 respectively form on the two sides of the second abutting part 71 and face the threading holes 61 of the first holding part 6, a second half screw hole 73 protrudingly formed on the second abutting part 71 and opposite to the first half screw hole 63 of the first abutting part 62. In an embodiment of the present invention, a second fixing hole 74 is formed in the second holding part 7 where is vertically below the second half screw hole 73, the second abutting part 71 is provided with a second containing chamber 75 with a second opening 751 to provide a second screw thread part 76 for embedding into the second containing chamber 75 from the second opening 751. A second internal screw hole 761 corresponding to the second fixing hole 74 of the second holding part 7 is formed on the second screw thread part 76, and a second fixing member 77 which is a screw penetrating into the second fixing hole 74 of the second holding part 7 and the second internal screw hole 761 of the second screw thread part 76, and the second fixing member 77 is in a manner of screw joint with the second internal screw hole 761 of the second screw thread part 76, and the second half screw hole 73 is protrudingly formed on the second screw thread part 76 on one end of the second abutting part 71. The two internal screw holes 72 of the second holding part 7 are internal threads of a nut. In addition, the first holding part 6 and the second holding part 7 are assembled as cross-shaped or polygonal-shaped. The first holding part 6 and the second holding part 7 further include a plurality of convex parts 60 (70) and concave arc parts 601 (701) arranged on outer peripheries of the first holding part 6 and the second holding part 7 at intervals, so as to facilitate electricians for holding the repairing tool 5. Shapes of the first screw thread part 66 and the second screw thread part 76 are oblong or rectangular.

The two positioning bolts 8 are respectively penetrated into the two threading holes 61 of the first holding part 6 and screwed joint with the two internal screw holes 72 of the second holding part 7. The first holding part 6 and the second holding part 7 move to each other through the two positioning bolts 8, so that the first half screw hole 63 on the first holding part 6 and the second half screw hole 73 on the second holding part 7 move close to each other to form a screw hole 50, wherein each of the two positioning bolts 8 includes a head end 81 penetrating into one of the two threading holes 61 of the first holding part 6, and a screw rod 82 externally stretching from the head end 81 to be screwed joint with one of the two internal screw holes 72 of the second holding part 7.

In one embodiment, shapes of the first containing chamber 65 of the first abutting part 62 and the second containing chamber 75 of the second abutting part 71 match with shapes of the first screw thread part 66 and the second screw thread part 76 to be oblong or rectangular. Please refer to FIG. 10, FIG. 11A, FIG. 11B, FIG. 11C, FIG. 14 and FIG. 15A, diameters of the first half screw hole 63 of the first abutting part 62 and the second half screw hole 73 of the second abutting part 71 match with linear diameter of the drawing-in wire 9 (9a). When the electricians have to change smaller screw holes or greater screw holes of the first screw thread part 66 and the second screw thread part 76 to coordinate with the linear diameter of the drawing-in wire 9 (9a), the first fixing member 67 and the second fixing member 77 are firstly loosened for taking out the first screw thread part 66 and the second screw thread part 76 originally installed, and replacing the smaller screw holes or the greater screw holes of first screw thread part 66 and the second screw thread part 76 to embed into the first containing chamber 65 of the first abutting part 62 as well as the second containing chamber 75 of the second abutting part 71, and the first fixing member 67 is screwed into the first fixing hole 64 of the first holding part 6 as well as the second fixing member 77 is screwed into the second fixing hole 74 of the second holding part 7, so that the first fixing member 67 is screwed joint with the first internal screw hole 661 of the first screw thread part 66 and the second fixing member 77 is screwed joint with the second internal screw hole 761 of the second screw thread part 76.

Figure 15B:
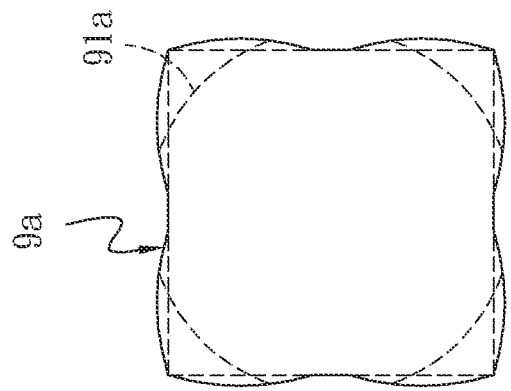
FIG. 15B is an enlarged side view of a drawing-in wire of a single-strand electric wire in FIG. 15A after being pressed and squeezed.
Figure 15A:
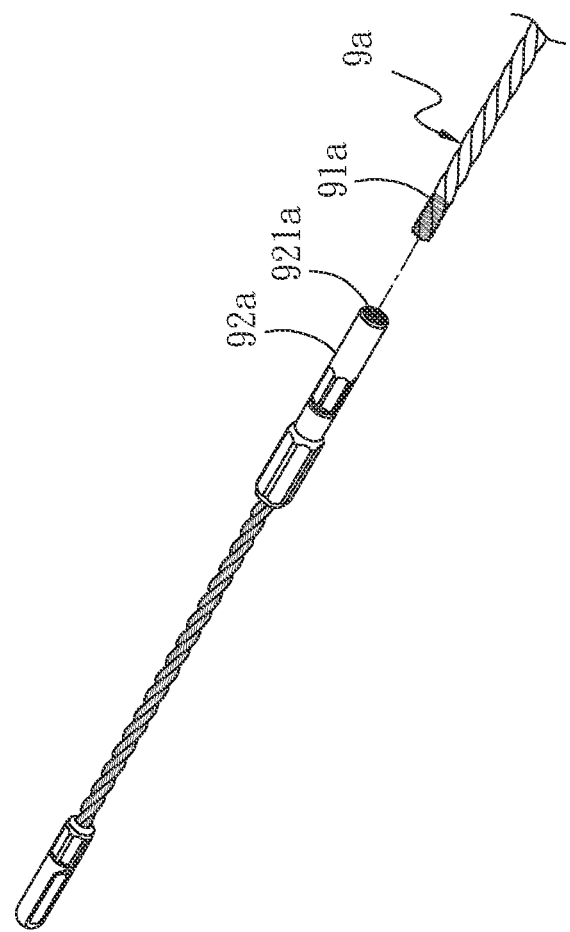
FIG. 15A is a three-dimensional exploded view of a drawing-in wire of a single-strand electric wire after being pressed and squeezed and an iron pulling head of the present invention.

Conventional drawing-in wires are made of a plurality of different materials: steel wire, nylon wire, glass fiber wire and PET wire. The repairing tool 5 of the present invention is suitable for a plastic wire that can be molded, the PET wire is frequently used at present. Therefore, in the embodiment of the present invention, the drawing-in wire 9 is illustrated with a PET wire. Please refer to FIG. 10, FIG. 11A, FIG. 11B, FIG. 11C and FIG. 12. The PET wire in this embodiment is a three-strand twisted rope, or a single-strand twisted rope as shown in FIG. 15A, FIG. 15B and FIG. 16, and shape of the single-strand twisted rope of the drawing-in wire 9a is square. In addition, there are two methods for combination of the PET wire and a pull head, i.e. a hydraulic stamping and a plastic perfusion. The above two methods cannot be onsite implemented to repair by the electricians, wherein the pull head is a plastic pulling head 92 including an internal screw thread 921 or an iron pull head 92a including an internal screw thread 921a with a soft axis, as shown in FIG. 12 and FIG. 13.

Figure 11B:
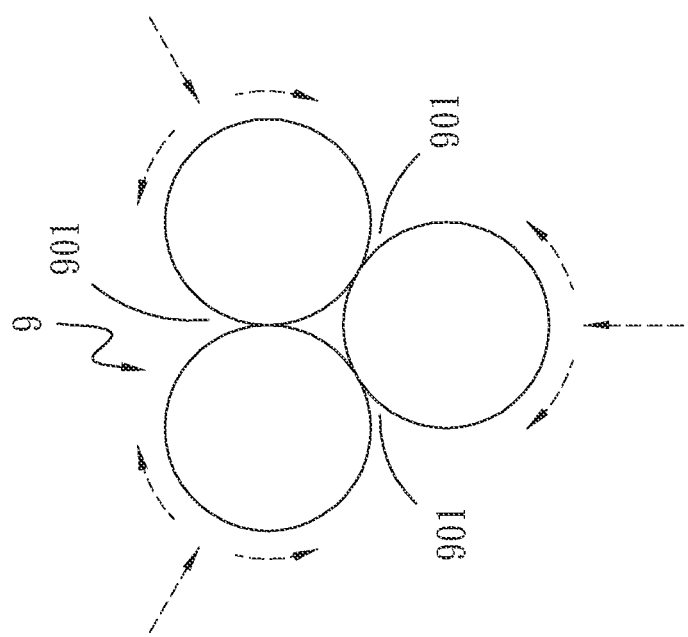
FIG. 11B is an enlarged schematic diagram of the side view of a drawing-in wire of an electric wire in FIG. 10 before being pressed and squeezed.
Figure 11A:
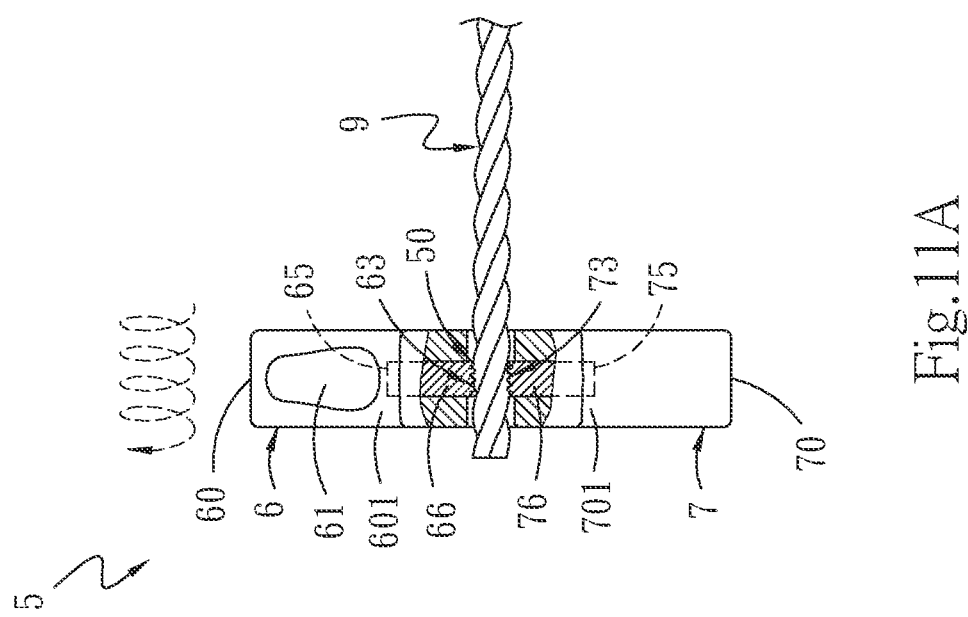
FIG. 11A is a side schematic diagram of a drawing-in wire of a screw hole pressing and squeezing electric wire of a repairing tool in FIG. 10.
Figure 12:
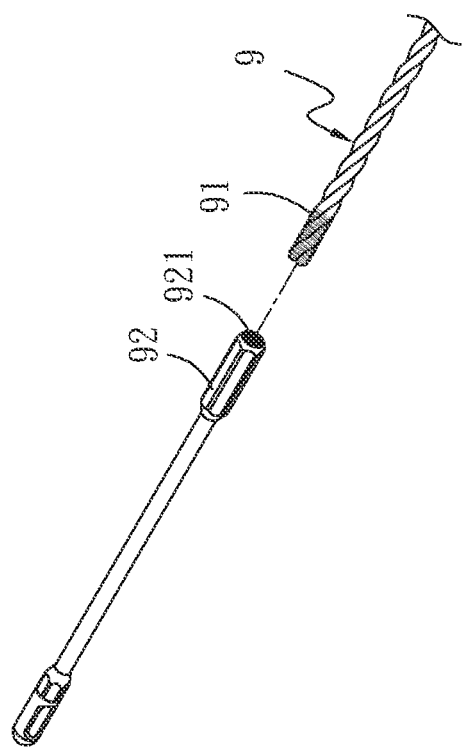
FIG. 12 is a three-dimensional exploded view of a drawing-in wire of an electric wire in FIG. 11C after being pressed and squeezed and a plastic pulling head.
Figure 13:
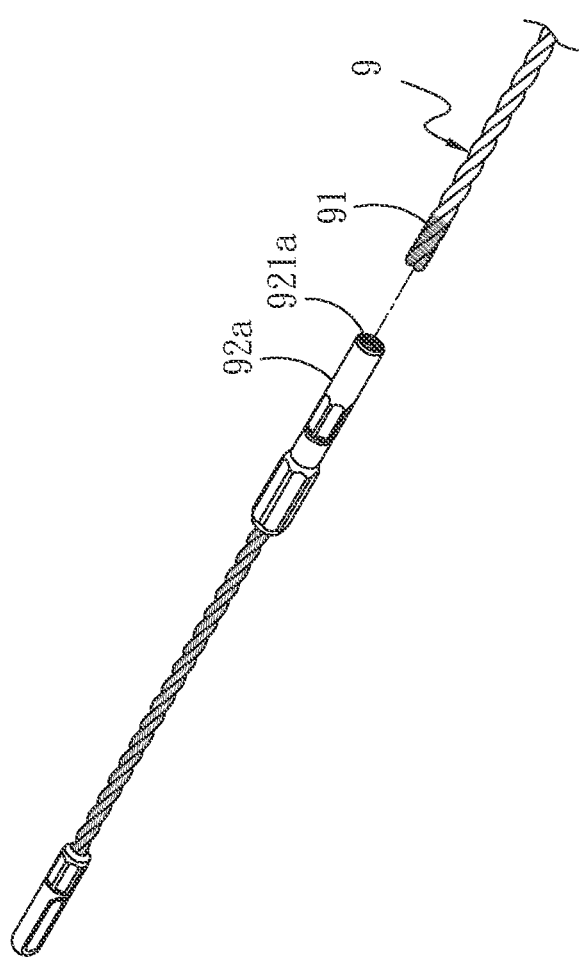
FIG. 13 is a three-dimensional exploded view of a drawing-in wire of an electric wire in FIG. 11C after being pressed and squeezed and an iron pulling head.
Figure 14:
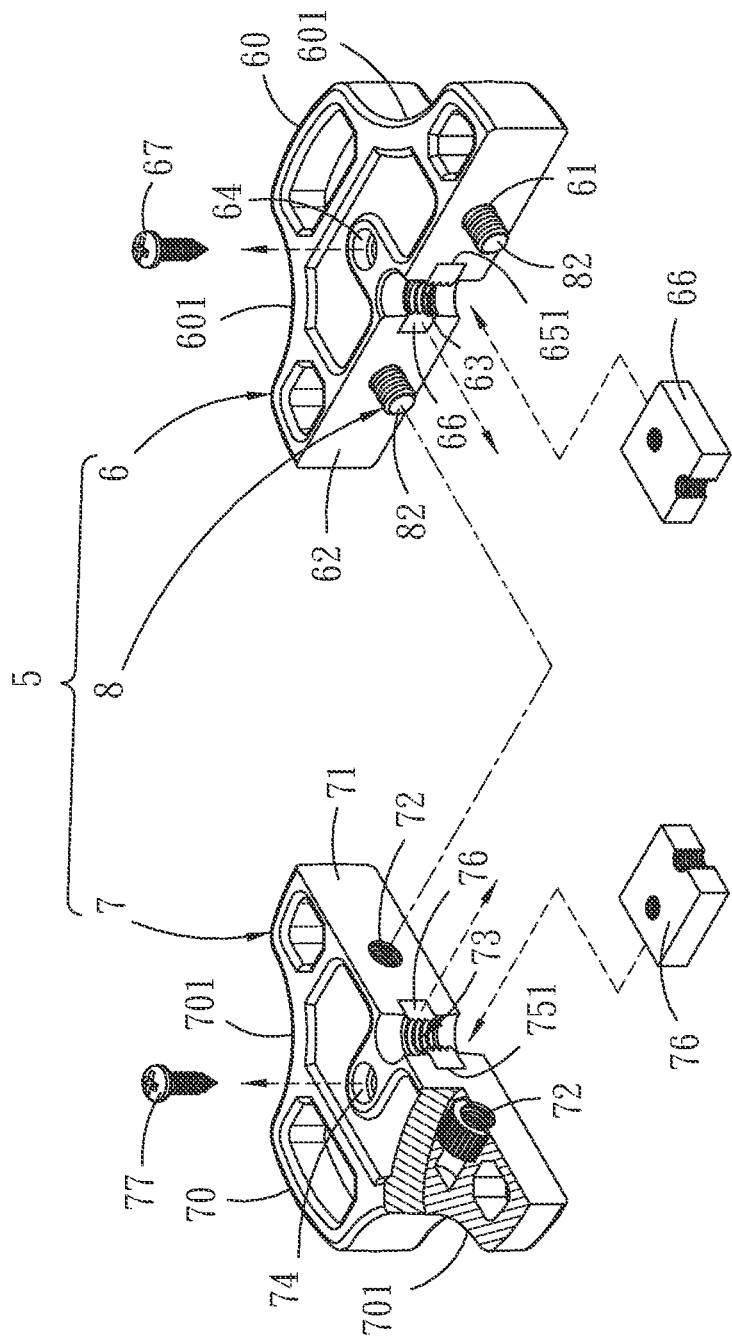
FIG. 14 is a three-dimensional schematic diagram of assembling a first screw thread part and a second screw thread part of a smaller screw hole replaced by a repairing tool for an electric wire threading head in the present invention.

Please refer to FIG. 10, FIG. 11A, FIG. 11B, FIG. 11C, FIG. 12 and FIG. 15A, when the drawing-in wires 9 (9a) is broken, or the pulling head at a front end of the drawing-in wire 9 (9a) is fallen off, a demand of onsite repair for the electricians can be met by using the repair tool 5. In detail, the two positioning bolts 8 are provided for the first holding part 6 and the second holding part 7 to move close to each other, so that the first half screw hole 63 of the first holding part 6 and the second half screw hole 73 of the second holding part 7 are simultaneously moving close to each other to form the screw hole 50. Through clockwise rotation or counter-clockwise rotation of the repairing tool 5, the drawing-in wire 9 (9a) is pressed and squeezed at a position where the drawing-in wire 9 (9a) broken by the screw hole 50 of the repair tool 5 so as to form an external screw thread part 91 (91a), and a screw thread area of the external screw thread part 91 (91a) is increased. As shown in FIG. 12, when the external screw thread part 91 of the drawing-in wire 9 is assembled with the plastic pull head 92, an instant dry adhesive (not shown in the figure) is applied on a surface of the external screw thread part 91, and then the external screw thread part 91 is screwed into the internal screw thread 921 of the plastic pull head 92 or the internal screw thread 921a of the iron pull head 92a as shown in FIG. 13, so that the drawing-in wire 9 is more closely attached to the plastic pulling head 92 or the iron pull head 92a, and a tensile strength of the drawing-in wire 9 is improved after bonding with the plastic pull head 92 or the iron pull head 92a, the position where the drawing-in wire 9 (9a) broken can be reproduced with a screw thread immediately by the electricians.

Please refer to FIG. 11A, FIG. 11B, FIG. 11C and FIG. 12, the repair tool 5 can be used for a conductive wire stretcher and a non-conductive wire stretcher. A front end of the non-conductive wire stretcher has to be equipped with the plastic pull head 92 insulated, or a front end of the conductive wire stretcher can be equipped with the iron pull head 92a as shown in FIG. 13, FIG. 14, FIG. 15A and FIG. 16, to replace existing repair tools which are a pencil sharpener 32 and an external screw thread tapping device 33.

Figure 11C:
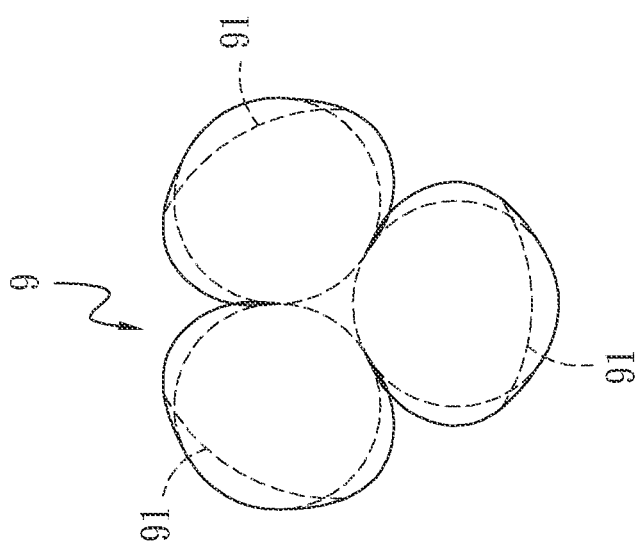
FIG. 11C is an enlarged side view of a drawing-in wire of an electric wire in FIG. 11B after being pressed and squeezed.

As shown in FIG. 11B, FIG. 11C and FIG. 15A, the repair tool 5 is provided with a forced molding ability for the first half screw hole 63 of the first holding part 6 and the second half screw hole 73 of the second holding part 7, wherein the first half screw hole 63 of the first holding part 6 and the second half screw hole 73 of the second holding part 7 move close to each other so as to form the screw hole 50, and a screw thread of the screw hole 50 presses and squeezes the drawing-in wires 9 (9a) by a pressing force. Through clockwise rotation or counter-clockwise rotation of the repair tool 5, the drawing-in wire 9 is squeezed in a space 901 between strands, and the drawing-in wire 9 is square as shown in FIG. 15B. Corners of the drawing-in wire 9a are pressed and squeezed to form the external screw thread part 91 (91a), thus, the external screw thread part 91 (91a) is formed by pressing and squeezing instead of scraping.

Please refer to the embodiments as shown in FIG. 10, FIG. 11A, FIG. 11B, FIG. 11C and FIG. 12, a thread direction of the screw hole 50 of the repair tool 5 is following with a twisted direction of the drawing-in wire 9, the drawing-in wire 9 is squeezed and pressed to form the external screw thread part 91 by the first half screw hole 63 of the first screw thread part 66 and the second half screw hole 73 of the second screw thread part 76 which are made in clockwise rotation or counter-clockwise rotation, so that the drawing-in wire 9 is smoothly screwed into the internal screw thread 921 of the plastic pull head 92 or the internal screw thread 921a of the iron pull head 92a as shown in FIG. 13. Therefore, the condition that the three twisted wires are loosened when rotating at different screw directions and results in resistance for screwing into the plastic pull head 92 or the iron pull head 92a can be avoided. The ideal condition is that the three-strand wires of the drawing-in wire 9 become tight when the PET wire rotates forwards, and after the drawing-in wire 9 is screwed into the bottom of the plastic pull head 92 or the iron pull head 92a, the three-strand wire is loosen in the opposite direction, so that the drawing-in wire 9 is more tightly attached to the internal screw thread 921 of the plastic pull head 92 or the internal screw thread 921a of the iron pull head 92a. The tensile strength of the drawing-in wire 9 after bonding with the plastic pull head 92 or the iron pull head 92a is increased; and the electricians are convenient for repairing the breaking position of the drawing-in wire 9 immediately at the operation site.

What is claimed is:

1. A repairing tool for an electric wire threading head, for pressing and squeezing a drawing-in wire, comprising:

a first holding part, comprising two threading holes respectively formed on two sides of the first holding part, a first abutting part formed at one end of the first holding part, and a first half screw hole protrudingly formed on the first abutting part, wherein a first fixing hole is formed on the first holding part, the first abutting part is provided with a first containing chamber with a first opening corresponding to the first half screw hole to provide a first screw thread part for embedding into the first containing chamber from the first opening, a first internal screw hole corresponding to the first fixing hole of the first holding part is formed in the first screw thread part, a first fixing member is penetrated into the first fixing hole of the first holding part and the first internal screw hole of the first screw thread part, the first fixing member is screwed to the first internal screw hole of the first screw thread part, and the first half screw hole is protrudingly formed on the first abutting part by the first screw thread part;

a second holding part, reversely disposed against the first holding part, wherein the second holding part comprises a second abutting part formed opposite to the first abutting part, two internal screw holes respectively formed on two sides of the second abutting part and face the threading holes of the first holding part, and a second half screw hole protrudingly formed on the second abutting part and opposite to the first half screw hole of the first abutting part, wherein a second fixing hole which is formed in the second holding part, the second abutting part is provided with a second containing chamber with a second opening corresponding to the second half screw hole to provide a second screw thread part for embedding into the second containing chamber from the second opening, a second internal screw hole corresponding to the second fixing hole of the second holding part is formed on the second screw thread part, a second fixing member penetrates into the second fixing hole of the second holding part and the second internal screw hole of the second screw thread part, and the second fixing member is correspondingly screwed joint with the second internal screw hole of the second screw thread part, and the second half screw hole is protrudingly formed on the second screw thread part from one end of the second abutting part; and two positioning bolts, which are respectively penetrated into the two threading holes of the first holding part and screwed joint with the two internal screw holes of the second holding part, the first holding part and the second holding part move to each other through the two positioning bolts, so that the first half screw hole of the first holding part and the second half screw hole of the second holding part form a screw hole, a thread of the screw hole is continuous, wherein a diameter of the first half screw hole and the second half screw hole oppositely arranged on the first abutting part and the second abutting part matches with a diameter of the drawing-in wire.

2. The repairing tool for the electric wire threading head according to claim 1, wherein shapes of the first screw thread part and the second screw thread part are oblong or rectangular, and shapes of the first containing chamber of the first abutting part and the second containing chamber of the second abutting part match with the first screw thread part and the second screw thread part to be oblong or rectangular.

3. The repairing tool for the electric wire threading head according to claim 1, wherein the two threading holes of the first holding part are countersunk holes, the two internal screw holes of the second holding part are internal threads of a nut, each of the two positioning bolts includes a head end penetrating into one of the two threading holes of the first holding part and a screw rod externally stretching from the head end to be screwed joint with one of the two internal screw holes of the second holding part.

4. The repairing tool for the electric wire threading head according to claim 1, wherein the first holding part and the second holding part are assembled as cross-shaped or polygonal-shaped.

5. The repairing tool for the electric wire threading head according to claim 4, wherein the first holding part and the second holding part further comprise a plurality of convex parts and concave arc parts arranged on outer peripheries of the first holding part and the second holding part at intervals.

\* \* \* \* \*